United States Patent [19]

Gibson et al.

[11] 4,372,535

[45] Feb. 8, 1983

[54] APPARATUS FOR ADJUSTING CABLE TENSION

[75] Inventors: David W. Gibson, Chester; Albert L. Hale, Berkeley Heights; Daniel L. Pope, Chester; Donald R. Rutledge, Budd Lake; Kirk P. Wells, Glen Gardner, all of N.J.

[73] Assignee: Bell Telephone Laboratories, Incorporated, Murray Hill, N.J.

[21] Appl. No.: 181,056

[22] Filed: Aug. 25, 1980

[51] Int. Cl.³ ............................................. B66D 1/76
[52] U.S. Cl. ............................. 254/319; 254/134.3 R; 254/368; 73/862.32; 73/862.44
[58] Field of Search ............... 254/134.3 R, 294, 299, 254/304, 305, 309, 317, 319, 350, 351, 368, 301, 348; 73/862.32, 862.44

[56] References Cited

U.S. PATENT DOCUMENTS

| 1,060,165 | 4/1913 | Cole | 254/351 X |
| 3,066,917 | 12/1962 | Tuplin et al. | 254/299 X |
| 3,143,309 | 8/1964 | Clarke . | |
| 3,162,041 | 12/1964 | Musser | 73/862.32 |
| 3,190,616 | 6/1965 | Oleson . | |
| 3,289,495 | 12/1966 | Leto et al. | 73/862.32 X |
| 3,355,148 | 11/1967 | Botello et al. | 254/301 X |
| 3,606,257 | 9/1971 | Wilson | 254/317 |
| 4,005,852 | 2/1977 | Schmitmeyer et al. | 73/862.44 |
| 4,023,744 | 5/1977 | Shutt . | |

Primary Examiner—John M. Jillions
Attorney, Agent, or Firm—Kurt C. Olsen; Jack S. Cubert

[57] ABSTRACT

A capstan winch for pulling cable through conduit includes means for measuring the torque applied to the capstan and a take-up reel. The torque measuring means comprises an inner drum connected by a tension spring to a concentric outer drum. A patterned disc on the inner drum is visible through a window in the outer drum. The pattern indicates the relative position of the inner and outer drums, which is correlated to the applied torque.

5 Claims, 1 Drawing Figure

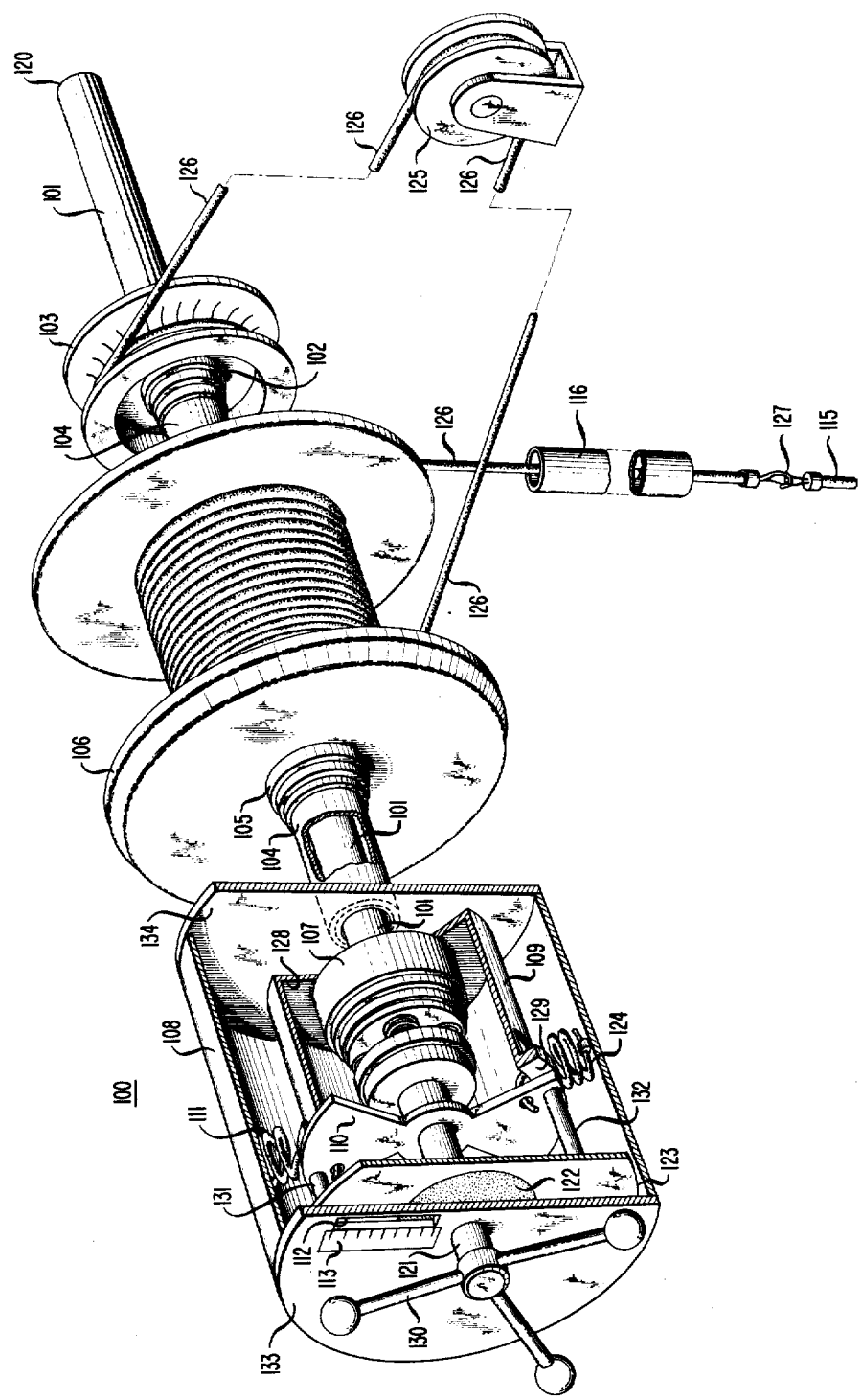

APPARATUS FOR ADJUSTING CABLE TENSION

BACKGROUND OF THE INVENTION

Our invention relates to a method and apparatus for pulling cable, and particularly for adjusting the maximum tension on lightguide communication cable being pulled through conduit.

Capstan winches have long been used to pull metallic conductor communication cable through underground conduit. More recently, the introduction of lightguide communication cable containing glass fibers has required careful control of the pulling tension. In a system for measuring pulling tension known as a running line dynamometer, a winch line is reeved over a sheave on a load cell. The dynamometer, however, measures only the tension on the winch line itself and not on a cable being pulled by the winch line through conduit. It is also difficult to calculate theoretically the maximum tension on a cable being pulled through conduit primarily because of the vagaries of conduit geometry.

An alternative to avoid the problems of the dynamometer and theoretical calculation is to measure the cable pulling tension directly. A prior in-line cell system has a load cell linked between the winch line and cable. The load cell signal is returned for processing via long conductors in the winch line. The in-line cell system, however, is delicate and inconvenient for routine field use.

It is therefore an object of the invention to provide a new and improved method for adjusting the maximum tension on a cable during installation through conduit. Another object is to provide new and improved apparatus for adjusting the tension on a cable being pulled through conduit.

SUMMARY OF THE INVENTION

The invention is a method for adjusting the maximum tension on a cable being pulled through conduit. A winch line is selected to match the weight and frictional characteristics of the cable. The cable is attached to the winch line for pulling. The tension on the winch line is determined and correlated to the maximum tension in the cable.

According to one aspect of the invention, a capstan applies traction to the winch line. The tension on the winch line is determined by measuring the torque applied to the capstan.

According to another aspect of the invention, the torque applied to the capstan and a take-up reel is measured by apparatus comprising an inner drum connected to a source of rotary power. The inner drum is connected by at least one tension spring to a concentric outer drum. The driving sides of a slip clutch and an overload clutch are connected to the outer drum. The driven sides of the overload clutch and the slip clutch are connected to the capstan and take-up reel, respectively. A disc attached to the inner drum has a pattern visible through a window in the outer drum. The position of the pattern relative to a scale adjacent to the window indicates the maximum tension that the cable will experience.

According to yet another aspect of the invention, the inner drum is connected to the source of rotary power by an adjustable clutch whereby the torque on the capstan is controllable.

BRIEF DESCRIPTION OF THE DRAWING

The drawing is a perspective view of a capstan winch embodying the present invention.

DETAILED DESCRIPTION OF THE INVENTION

A method of adjusting the maximum tension on a cable 115 being pulled with a winch line 126 through a conduit 116 comprises matching the weight and frictional characteristics of winch line 126 to the weight and frictional characteristics of cable 115. In particular, winch line 126 may be selected to exhibit substantially the same coefficient of friction with respect to conduit 116 as cable 115. Winch line 126 may comprise a stranded wire rope coated with the same material, such as high density polyethylene, that sheathes cable 115. Advantageously, winch line 126 may have substantially the same weight per unit length as cable 115. Alternatively, the weight per unit length of winch line 126 may be fractionally matched to cable 115.

Since the weight and frictional characteristics of winch line 126 and cable 115 are matched, both experience the same tension at any fixed reference point in conduit 116. The pulling tension from a source of rotary power (not shown) exerted on winch line 126 thus correlates to the maximum tension applied to cable 115. The method of adjusting the maximum tension on cable 115 therefore includes the further step of measuring the pulling tension exerted on winch line 126. The pulling tension exerted on winch line 126 may be measured by apparatus known in the art, such as a running line dynamometer, or, in accordance with the invention, by measuring torque in a capstan winch 100.

As seen in the drawing, capstan winch 100 comprises a shaft 101 connected at end 120 to the source of rotary power. The other end of shaft 101 connects to the driving side of an adjustable clutch 107. Advantageously, adjustable clutch 107 may be a dry plate clutch which slips at alterable torque ratings. Shaft 101 may be splined at the connection to the driving side so that the driving side can be moved longitudinally for engaging the driven side of adjustable clutch 107. One end of a rotatable bar 121 is threadably attached to the driving side of adjustable clutch 107. The other end of a rotatable bar 121 is attached to a handle 130. By turning handle 130, the pressure exerted by the driving side upon the driven side, and thus the torque transmitted, can be altered.

The driven side of adjustable clutch 107 is mechanically connected to the inside of a back panel 128 of an inner drum 109. A butterfly 110 is concentric with inner drum 109 and is connected, for example welded, to a flange 129 on inner drum 109. Tension springs 111 and 124 each attach at one end to the perimeter of butterfly 110. The opposite ends of tension springs 111 and 124 attach to the inside of an outer drum 108. A front panel 133 of outer drum 108 has a scale 113 adjacent to a window 112. At one end, spacer posts 131 and 132 are connected, for example welded, to butterfly 110. At the opposite end, spacer posts 131 and 132 are connected, for example welded, to a disc 123. Advantageously, disc 123 is circular and is concentric with inner drum 109. A pattern 122, advantageously a spiral, on disc 123 is visible through window 112. When the rotational orientation of inner drum 109 changes with respect to outer drum 108, the top edge of pattern 122 appears to move along scale 113.

The outside of a rear panel 134 of outer drum 108 is connected, for example bolted, to one end of a tube 104. Tube 104 is connected to the driving side of a slip clutch 105. Advantageously, slip clutch 105 may be a dry plate clutch while slips at a selected torque rating. The driven side of slip clutch 105 is connected to a take-up reel 106. Winch line 126 is stored on take-up reel 106.

Tube 104 is further connected to the driving side of an overload clutch 102. Advantageously, overload clutch 102 may be a dry plate clutch which slips at a selected torque rating. The driven side of overload clutch 102 is connected to a capstan 103. Winch line 126 is coiled around capstan 103 and is attached by a coupling 127 to cable 115. Coupling 127 may comprise a hook-and-eye arrangement, as shown, or other coupling arrangements as known in the art. Capstan 103 applies traction to winch line 126 for pulling cable 115. Winch line 126 is drawn off capstan 103 through a bight around a sheave 125 to take-up reel 106.

In operation, winch line 126 is paid out from take-up reel 106 to connect the cable 115 with coupling 127. The source of rotary power turns end 120 of shaft 101 clockwise. The other end of shaft 101 turns the driving side of adjustable clutch 107. Handle 103 is rotated in the clockwise direction to engage the driving side with the driven side of adjustable clutch 107. As adjustable clutch 107 engages, inner drum 109 turns incrementally in the clockwise direction. The movement of inner drum 109 causes tension springs 111 and 124 to elongate, thereby turning outer drum 108 incrementally in the clockwise direction. Outer drum 108 turns tube 104. Tube 104 turns the driving side of slip clutch 105 and the driving side of overload clutch 102. Slip clutch 105 limits the moment transmitted to take-up reel 106 so that the maximum tension in winch line 126 between the take-up reel and capstan 103 is relatively low. Overload clutch 102 limits the torque transmitted to capstan 103 so that the maximum pulling tension will not break the cable being pulled.

Initially, the static load presented by winch line 126 resists the torque transmitted to capstan 103 and the capstan does not rotate. As adjustable clutch 107 is further tightened with handle 130, more torque is applied to capstan 103. When adjustable clutch 107 is tightened to nonslipping engagement, the torque applied to capstan 103 exceeds the static load resistance of winch line 126. Inner drum 109, handle 130, outer drum 108, and tube 104 begin continuous clockwise rotation. Take-up reel 106 and capstan 103 also begin continuous clockwise rotation, causing winch line 126 to reel in. If the clockwise rotation of handle 130 is blocked, adjustable clutch 107 disengages, stopping the rotation of inner drum 109, outer drum 108, tube 104, take-up reel 106, and capstan 103.

Springs 111 and 124 deflect elastically within the expected range of torques applied by the source of rotary power to capstan 103 and take-up reel 106. The rotational orientation of inner drum 109 with respect to outer drum 108 therefore varies with the magnitude of applied torque. The magnitude of applied torque is visually indicated by pattern 122 viewed through window 112. When the radius of winch line 126 is the same around both capstan 103 and take-up reel 106, the pulling tension on the winch line is equal to the magnitude of applied torque divided by the radius of the capstan. Since the radius of capstan 103 is constant, scale 113 may be conveniently calibrated in units of force. The pulling tension on winch line 126 is also equal to the maximum pulling tension exerted on cable 115 because winch line 126 matches the weight and frictional characteristics of the cable. As take-up reel 106 fills during winding, the radius of winch line 126 around the take-up reel increases as compared to its radius around capstan 103. The increase in radius induces a small calibration error in scale 113. The error is negligible in field operations because slip clutch 105 limits the torque on take-up reel 106 to a relatively low value.

While the invention has been shown and described with reference to particular embodiments, it is to be understood that numerous changes may be made in form and details without departing from the spirit and scope of the invention. For example, adjustable clutch 107 may be any clutch which slips at alterable torque ratings, such as a hydraulic clutch. Further, tension springs 111 and 124 may be supplemented with dampers, such as hydraulic shock absorbers, to minimize oscillation. Capstan winch 100 may be equipped with apparatus to measure the length of winch line paid out, such as a cam and follower to count the revolutions of capstan 103.

We claim:

1. A capstan winch for pulling cable through conduit comprising a source of rotary power, an overload clutch having a driving side connected to the source of rotary power and having a driven side, a winch line, a capstan connected to the driven side of the overload clutch for applying traction to the winch line, a slip clutch having a driving side connected to the source of rotary power and having a driven side, a take-up reel connected to the driven side of the slip clutch, characterized in that the capstan winch (100) includes means for measuring the torque applied to the capstan (103) and the take-up reel (106) comprising an inner drum (109) connected to the source of rotary power, a tension spring (111 or 124), an outer drum (108) concentric with the inner drum (109) and connected to the inner drum (109) by the tension spring (111 or 124), a disc (123) concentric with the inner drum (109) and connected to the inner drum (109), a window (112) in the outer drum (108), a pattern (122) on the disc (123) visible through the window (112), and a tube (104) connects the driving side of the overload clutch (102) and the driving side of the slip clutch (105) to the outer drum (108)

whereby the torque is indicated by the relative position of the pattern (122) with respect to the window (112).

2. Apparatus according to claim 1 further characterized in that an adjustable clutch (107) has a driving side connected to the source of rotary power and has a driven side, the inner drum (109) is connected by the driven side of the adjustable clutch (107) to the source of rotary power whereby the torque applied to the capstan (103) and the take-up reel (106) is alterable responsive to the adjustable clutch (107).

3. Apparatus according to claim 1 further characterized in that the overload and slip clutches (102, 105) are dry plate clutches.

4. Apparatus according to claim 2 further characterized in that the adjustable clutch (107) is a dry plate clutch.

5. A capstan winch for pulling cable through conduit comprising a source of rotary power, a shaft connected to the source of rotary power, an adjustable clutch having a driving side connected to the shaft and having a driven side, a rotatable bar threadably connected at one end to the driving side of the adjustable clutch for altering the torque transmitted from the driving side to the driven side of the adjustable clutch, a handle connected at the other end of the rotatable bar for turning the rotatable bar, an inner drum connected to the driven side of the adjustable clutch, a tension spring, an outer drum connected to the inner drum by the tension spring, a butterfly concentric with the inner drum and connected to the inner drum, a spacer post, a disc concentric with the inner drum and connected to the inner drum by the spacer post, a window in the outer drum, a pattern on the disc visible through the window, a tube concentric with the outer drum and connected to the outer drum, a slip clutch having a driving side connected to the tube and having a driven side, a winch line which matches the weight and frictional characteristics of the cable, a take-up reel connected to the driven side of the slip clutch for storing the winch line, an overload clutch having a driving side connected to the tube and having a driven side, a capstan connected to the driven side of the overload clutch for applying traction to the winch line, a sheave for routing the winch line from the take-up reel to the capstan whereby the maximum tension in the cable is indicated by the relative position of the pattern with respect to the window and the tension in the cable is controllable.

* * * * *